United States Patent
Dutschmann et al.

(10) Patent No.: US 10,907,120 B2
(45) Date of Patent: Feb. 2, 2021

(54) TANK OUTLET HAVING A VORTEX BREAKER AND METHOD FOR MOUNTING A VORTEX BREAKER ON THE TANK OUTLET OF A TANK

(71) Applicant: GEA Tuchenhagen GmbH, Büchen (DE)

(72) Inventors: Dean Dutschmann, Kitzingen (DE); Christian Klemme, Kitzingen (DE); Bernd Bumester, Kitzingen (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 16/324,151

(22) PCT Filed: Aug. 7, 2017

(86) PCT No.: PCT/EP2017/069962
§ 371 (c)(1),
(2) Date: Feb. 8, 2019

(87) PCT Pub. No.: WO2018/029152
PCT Pub. Date: Feb. 15, 2018

(65) Prior Publication Data
US 2019/0185795 A1 Jun. 20, 2019

(30) Foreign Application Priority Data
Aug. 10, 2016 (DE) .......................... 10 2016 214 857

(51) Int. Cl.
*E03F 5/10* (2006.01)
*C12C 13/00* (2006.01)
*C12H 1/22* (2006.01)

(52) U.S. Cl.
CPC ............... *C12C 13/00* (2013.01); *C12H 1/22* (2013.01); *E03F 5/106* (2013.01); *Y10T 137/86348* (2015.04)

(58) Field of Classification Search
CPC .. E03F 5/106; Y10T 137/86348; C12C 13/00; C12C 1/22
(Continued)

(56) References Cited

U.S. PATENT DOCUMENTS 2,946,345 A * 7/1960 Weltmer ................. F16K 17/42
137/590
4,442,858 A * 4/1984 Everett ................... F04D 13/16
137/207
(Continued)

FOREIGN PATENT DOCUMENTS

| CN | 202 295 963 U | 7/2012 |
| EP | 0 080 420 A1 | 6/1983 |

OTHER PUBLICATIONS

International Search Report and Written Opinion for corresponding Patent Application No. PCT/EP2017/069962 dated Nov. 10, 2017.

*Primary Examiner* — William M McCalister
(74) *Attorney, Agent, or Firm* — Renner, Otto, Boisselle & Sklar, LLP

(57) ABSTRACT

A tank outlet (1) of a tank (100) comprising a tube fitting body (10), with an inlet region (11), which can be mounted on an outlet region (111) of a tank (100), a vortex breaker (20), which is mounted solely on the tube fitting body (10), wherein the vortex breaker (20) extends into the tank (100) through the inlet region (11) and does not touch the tank (100). Moreover, a method for mounting a corresponding vortex breaker (20) on a tank outlet (1) of a tank (100) is claimed.

10 Claims, 7 Drawing Sheets

Figure 1:
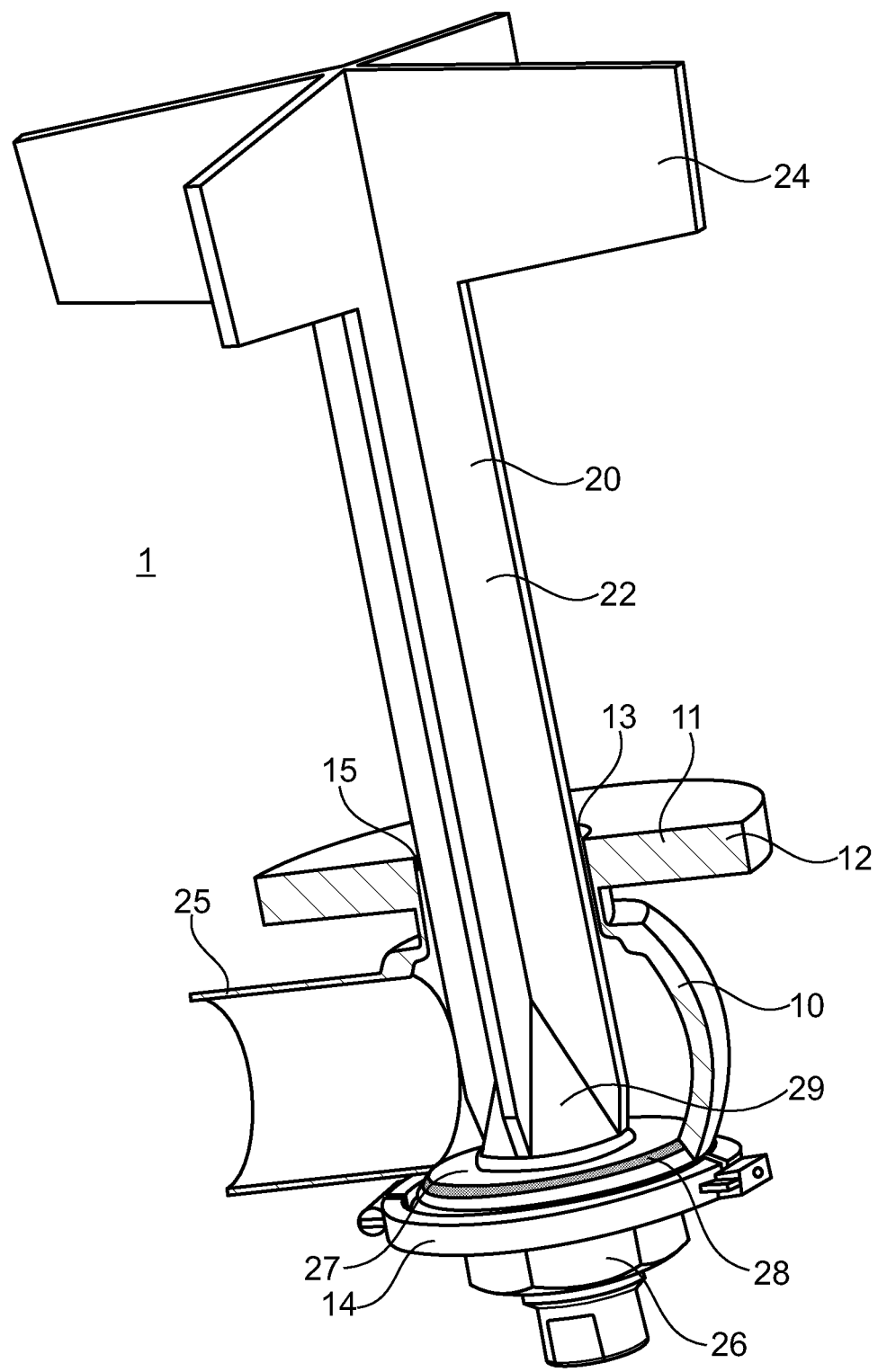

(58) Field of Classification Search
USPC .......................................................... 137/590
See application file for complete search history.

(56) References Cited

U.S. PATENT DOCUMENTS

| | | | | |
|---|---|---|---|---|
| 4,467,830 | A * | 8/1984 | Hutchinson | E03C 1/102 |
| | | | | 137/590 |
| 5,790,619 | A * | 8/1998 | Peck | G21C 19/28 |
| | | | | 376/299 |
| 6,014,987 | A * | 1/2000 | List | B64D 37/08 |
| | | | | 137/549 |
| 8,397,751 | B1 * | 3/2013 | Chan | G11B 5/8408 |
| | | | | 137/590 |
| 8,739,823 | B2 * | 6/2014 | Van Haaren | E03B 11/04 |
| | | | | 137/590 |
| 9,004,101 | B2 * | 4/2015 | Beretta, III | E03B 11/12 |
| | | | | 137/590 |
| 2003/0056838 | A1 * | 3/2003 | Grayson | B64G 1/402 |
| | | | | 137/590 |
| 2004/0155368 | A1 * | 8/2004 | Boulant | B01F 3/04609 |
| | | | | 261/91 |
| 2005/0229982 | A1 * | 10/2005 | Gonzales | E03F 5/101 |
| | | | | 137/590 |
| 2009/0206044 | A1 * | 8/2009 | Van Toever | A01K 63/006 |
| | | | | 210/788 |
| 2013/0160878 | A1 * | 6/2013 | Murai | B01F 5/0057 |
| | | | | 137/590 |
| 2013/0206263 | A1 | 8/2013 | Brownlow et al. | |
| 2014/0196790 | A1 * | 7/2014 | Grayson | F02K 9/605 |
| | | | | 137/1 |
| 2015/0252753 | A1 * | 9/2015 | Lopez | B64G 1/402 |
| | | | | 60/39.091 |

* cited by examiner

TANK OUTLET HAVING A VORTEX BREAKER AND METHOD FOR MOUNTING A VORTEX BREAKER ON THE TANK OUTLET OF A TANK

1. TECHNICAL FIELD

The present invention relates to a tank outlet with a vortex breaker and to a method for mounting the vortex breaker in a tank outlet of a tank. The tank may be a liquid tank as preferably used in food industries.

2. PRIOR ART

Tanks, in particular liquid tanks, are used for storing liquids, suspensions or other fluids, for example for storing beer or its intermediate products in a brewery. The tanks are usually designed for accommodating large amounts of a liquid, which can additionally be pressurized. Thus, the tanks must provide a high compressive strength and comply with acknowledged standards. The proof is carried out by means of so-called pressure tests, which have to be repeated after each significant change to the structure of the tank in order to guarantee safety of the tank. A structural modification of a pressure tank usually requires a further pressure test, which may be cost-intensive. Such structural modifications for example include welding of the tank.

Draining of a tank is usually carried out via a tank outlet at the bottom of the tank. When a tank is drained, a vortex forms on its outlet above a certain filling level due to different flow effects. In the course of this, the liquid rotates about a vertical axis inside the tank, said vertical axis extending approximately centrally through the tank outlet. The effect of vortex formation is also caused by the use of centrifugal pumps which are often used for draining a tank. At this, the rotation of the impeller of the centrifugal pump induces an angular momentum in the liquid, which spreads back into the tank.

The gas, most often air, $CO_2$ or nitrogen, which is located above the liquid in the tank, is drawn into the liquid and mixed with it by the vortex at the tank outlet. However, many liquids, especially in food industries, are sensitive to the oxygen contained in the drawn-in air, such that blending of gas and liquid should be avoided for reasons of product quality.

In addition to this, gas that is drawn into the tank outlet reduces liquid throughput. Accordingly, it is advantageous to prevent the formation of vortices when draining a tank.

Document U.S. Pat. No. 4,394,966 describes an anti-vortex device at the bottom wall of a storage tank, said device being arranged above its drain opening. By means of this device, the draining fluid is forced to make a substantially 90 degree turn in order to prevent a vortex.

Document U.S. Pat. No. 5,382,003 shows a flow control device for limiting the formation of vortices occurring as tanks are discharged, in particular from liquid steel. The device is mounted above the exit or is integral with the exit and divides the liquid flow into four partial streams that are to prevent the formation of a vortex.

Document U.S. Pat. No. 6,014,987 shows an anti-vortex assembly in a propellant tank of a drive for space vehicles, which is mounted on the tank in the region of the tank outlet.

Document US 2003/0056838 shows a further device for preventing vortices in a propellant tank. The arrangement essentially comprises a larger horizontal vane as well as several smaller vertical vanes, which are respectively provided with bores and which are arranged above the drain of the tank. The arrangement is mounted on the bottom of the tank by means of mounting elements.

The possibility of a complete and sanitary purification of all elements that come into contact with the liquid is a core requirement for tanks in food industries. Thus, in the area accessible for the liquid, there must not be any so-called dead spots, i.e. areas in which small residues of the liquid or solids could aggregate where these could not be captured by the purification. This particularly applies to spots where parts touch loosely, i.e. where smallest gaps are formed that cannot be purified. Threads that are not correspondingly sealed, also rank among these.

Therefore, it is the object of the present invention to provide a tank outlet with a vortex breaker which solves the aforementioned problems, is easy to manufacture and may be assembled and disassembled in just a few steps without structural modifications of the tank having to be carried out in the course of this. Additionally, the vortex breaker ought to be entirely sanitarily purifiable, preferably directly in the built-in state, to allow for it to be used for tanks in food industries.

3. SUMMARY OF THE INVENTION

According to the invention, the aforementioned problems are solved by a tank outlet with a vortex breaker as claimed and a method for mounting a vortex breaker on the tank outlet of a tank as claimed.

In particular, the aforementioned problems are solved by a tank outlet of a tank comprising a tube fitting body, with an inlet region, which can be mounted on an outlet region of a tank, a vortex breaker, which is mounted solely on the tube fitting body, wherein the vortex breaker extends into the tank through the inlet region and does not touch the tank.

The outlet region is part of the pressure-tested tank. Via the outlet region, easy and safe connection of the tank with the tube fitting body is ensued. Such a tube fitting body may for example be a commercially available VARIVENT® corner housing having a corresponding inlet region. Preferably, the inlet region and the outlet region are screwed to one another, such that structural modifications to the tank are not required. Moreover, such a connection is releasable and besides the mounting means for the connection, no additional mounting means are required on the tank.

The vortex breaker according to the invention extends through the inlet region of the tube fitting body and into the tank, whereby vortices both in the tank and in the inlet opening of the inlet region are prevented. Furthermore, the vortex breaker does not touch the tank, such that there are no dead spots and the vortex breaker may be completely and sanitarily purified.

By mounting the vortex breaker solely on the tube fitting body, no modifications are carried out on the tank itself. Hence, no new pressure test or the like is necessary. Moreover, the vortex breaker may easily and cost-effectively be retrofitted to the tank and also be removed again without any modifications to the tank being required. Thus, the vortex breaker according to the invention is suitable for retrofitting of all tanks, in particular liquid tanks in food industries, comprising an outlet region at the tank outlet.

Preferably, the vortex breaker further does not touch a wall of an outlet opening in the outlet region of the tank. Hence, dead spots, in which deposits might occur, which result in impurities and are hardly or not at all purifiable, are also prevented between these elements. Moreover, it is prevented that due to a direct contact between the vortex breaker and the inlet region damage or corrosion occurs on the surfaces. Due to the absence of contact, the vortex breaker does not affect the connection or the tank itself.

Preferably, the vortex breaker further does not touch a wall of an inlet opening in the inlet region of the tube fitting body. The advantages of full purification capability, resistance to corrosion and easy retrofit also apply to the contactless arrangement of the vortex breaker towards the inlet region of the tube fitting body.

Preferably, the vortex breaker has a foot region mounted on the tube fitting body and a head region which is held inside the tank by the foot region. The vortex breaker is mounted solely on the tube fitting body, whereby fast mounting may be carried out with just a few mounting means or materials. The mounting is further independent of the tank, such that when assembling the tank outlet according to the invention, merely the existing connection between the tank and the tube fitting is used. Hence, no structural modifications to the tank itself, which would require a new pressure test, are carried out.

Preferably, the foot region of the vortex breaker divides the inlet opening into at least two, more preferably three or preferably four sections. Hence, the foot region of the vortex breaker contributes to the prevention of a vortex by dividing the liquid flow into several partial streams. In case each partial stream contributes to the formation of vortices, these sub-vortices erase each other.

Preferably, the vortex breaker has continuously closed surfaces. A continuously closed surface for example is a surface without holes, recesses or the like. Due to the closed surfaces of the vortex breaker, the liquid may stream along the vortex breaker in a laminar flow and does not swirl. In contrast to this, in case of a perforated surface crossflows through the holes occur and generate small swirls. These swirls, in turn, may result in an undesired mixing or demixing of gas and liquid and are prevented by means of the continuously closed surface. Moreover, a continuously closed surface is easier to purify and avoids dead spots in which possible residues might aggregate.

Preferably, the head region of the vortex breaker comprises at least one dimension measured in the horizontal plane, which is larger than the diameter of the inlet opening. The larger the head region is, the better it prevents the formation of vortices in the tank. Preferably, the dimension of the head region amounts to at least 3.5 times the diameter of the inlet opening. Preferably, the dimension of the head region amounts to 1.5 times to 5 times the diameter of the inlet opening. More preferably, the dimension of the head region amounts to 3 times to 4 times the diameter of the inlet opening. Even more preferably, the dimension of the head region amounts to 3.5 times to 3.9 times the diameter of the inlet opening. Moreover, dimensions significantly larger than 5 times the diameter of the inlet opening are also possible.

Preferably, the foot region of the vortex breaker comprises a maximum dimension measured in the horizontal plane, which is smaller than the diameter of the inlet opening. If the foot region is narrower than the diameter of the inlet opening, the foot region and the wall of the inlet opening and the outlet opening are not in direct contact with each other. By means of this contactless arrangement, damage and contact corrosion on the surfaces of both elements are avoided. Furthermore, no dead spots that cannot be purified ensue between the foot region and the wall of the inlet opening and the outlet opening.

The foot region divides the flow-through region inside the inlet and outlet regions into at least two essentially separate regions. Preferably, the maximum dimension of the foot region amounts to 0.5 times to 0.95 times the diameter of the inlet opening. More preferably, the maximum dimension of the foot region amounts to 0.8 times to 0.9 times the diameter of the inlet opening. Even more preferably, the maximum dimension of the foot region amounts to 0.85 times to 0.87 times the diameter of the inlet opening. In a preferred embodiment, the distance between the maximum dimension of the foot region and the diameter of the inlet opening amounts to 8 mm.

Preferably, the foot region of the vortex breaker comprises vertically arranged essentially planar elements with a smooth surface. As the foot region extends through the entire flow-through region through the inlet region and the outlet region, no vortices occur there. Moreover, the smooth surface is light and may be sanitarily purified, as impurities cannot settle permanently.

Preferably, the head region of the vortex breaker comprises vertically arranged essentially planar elements with a smooth surface. The smooth surface provides the same advantages of laminar flow and sanitary purification as already described in the context of the foot region of the vortex breaker. The vertical arrangement of the elements further allows for direct drain of the liquid top down, i.e. in vertical direction, into the tube fitting body.

Preferably, the foot region is detachably mounted on the tube fitting body by means of a screw connection. The screw connection represents an easy and safe type of mounting. Hence, the vortex breaker may be easily inserted, replaced or removed. The vortex breaker merely has to be inserted through the tank through the outlet region and the inlet region and may then be screwed from an easily accessible position outside the tank.

Preferably, the foot region has a conical base. The conical form provides for longer mounting edges between the foot region and the base, along which the foot region is preferably welded to the base. The conical form further avoids sharp corners between the foot region and the base which could create dead spots. The large circular bottom surface of the cone provides a large diameter for the screw connection and hence a secure mounting of the vortex breaker on the tube fitting body.

Preferably, the tube fitting body further comprises an openable cover facing the inlet region, which the vortex breaker is mounted to. Mounting the vortex breaker is easy as it is merely inserted through the outlet opening and the inlet opening and then mounted on the opposite cover of the tube fitting body. Inserting the vortex breaker into an existing system is further facilitated by the fact that merely the cover has to be modified to allow for the vortex breaker to be mounted on it. No modifications to the tank itself have to be carried out. A modification of the cover is moreover significantly cheaper than an adaption of the tank. By exchanging the openable cover, inserting or removing the vortex breaker is facilitated significantly. If plugging occurs in the tank drain, it may be removed via the openable cover through an access.

Preferably, the screw connection comprises a seal which seals the screw connection outside the liquid region towards the cavity of the tube fitting body, wherein the seal is arranged on the respective edges between a cover and a base of the foot region as well as the cover and the tube fitting body and forms a convexly shaped surface towards the inside of the tube fitting body. By means of this special arrangement of the seal on the edges and the formation of a convex surface towards the inside of the cavity of the tube fitting body, the seal may be purified easily and sanitarily. Hence, the screw connection does not come into contact with the content of the tank.

The aforementioned problems are also solved by means of a method for mounting a vortex breaker on a tank outlet of a tank, comprising the following steps:

a.) mounting a tube fitting body, with an inlet region, on an outlet region of a tank;

b.) inserting a vortex breaker from inside the tank through the outlet region of the tank and the inlet region of the tube fitting body into the tube fitting body; and c.) mounting the vortex breaker solely on the tube fitting body, such that the vortex breaker extends through the inlet region of the tube fitting body into the tank and does not touch the tank.

Mounting a tube fitting body on a tank with the aid of an inlet region allows for a pressure-resistant connection and a direct mounting on an existing outlet region of a tank. The connection between the tank and the tube fitting body may be carried out easily, cost-effectively and without additional effort. Inserting a vortex breaker through the outlet opening in the outlet region of the tank and the inlet opening in the inlet region of the tube fitting body inside the tank allows for the use of vortex breakers with large dimensions. By mounting the vortex breaker solely on the tube fitting body, such that the vortex breaker extends through the inlet region into the tank and does not touch the tank, a sanitary and easily purifiable arrangement of the vortex breaker is enabled. By means of the described method, easy mounting of the vortex breaker into an existing tank outlet is enabled. Moreover, by means of inserting the vortex breaker as described, the formation of vortices is prevented in a large region both in the outlet itself as well as in the tank in front of it, in order to ensure sanitary purification of the tank outlet, also with the vortex breaker being built in.

4. BRIEF DESCRIPTION OF THE FIGURES

Figure 2:
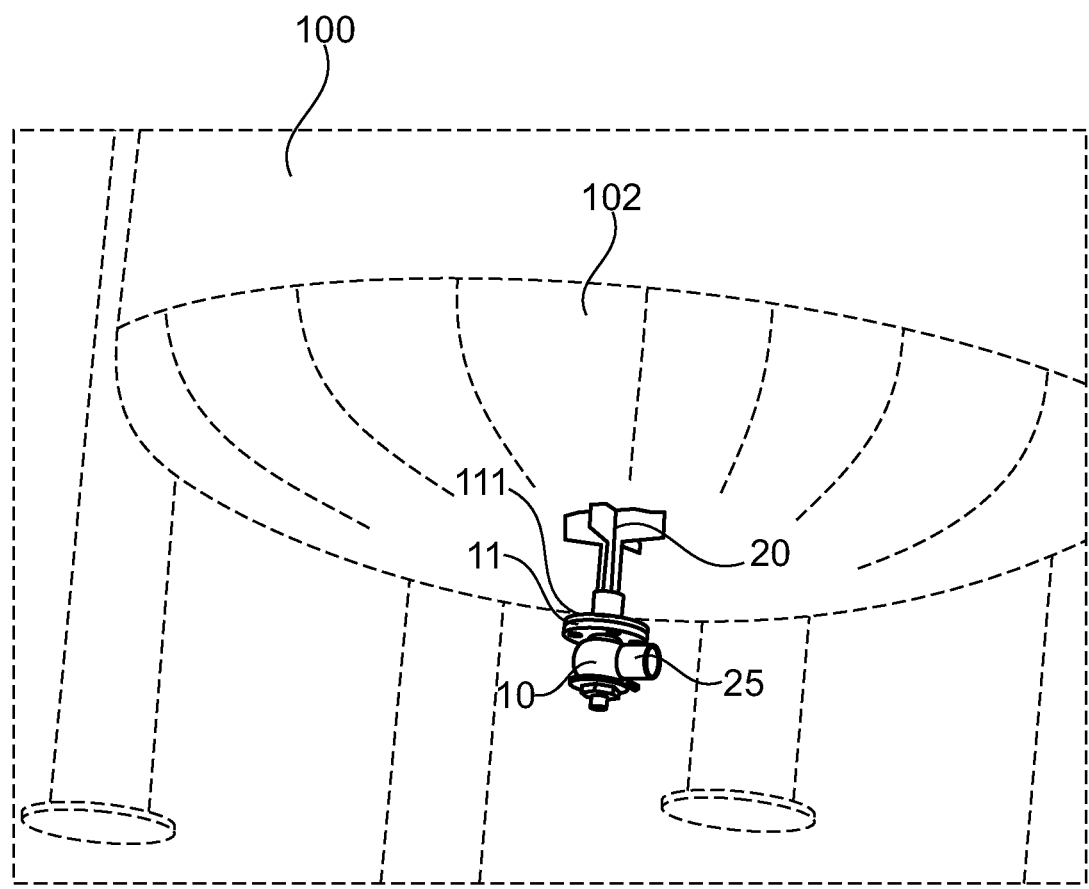
Figure 3:
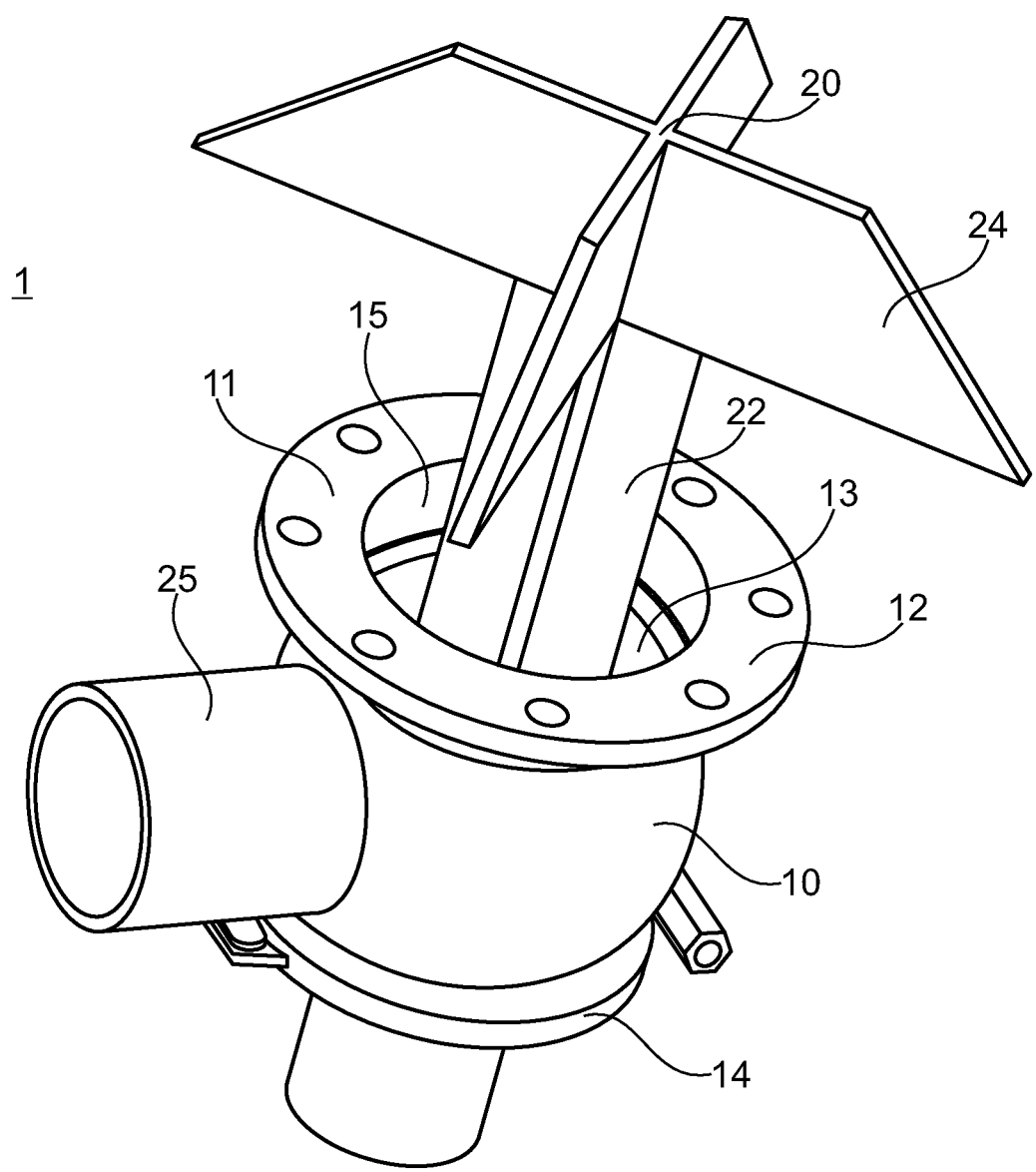
Figure 4:
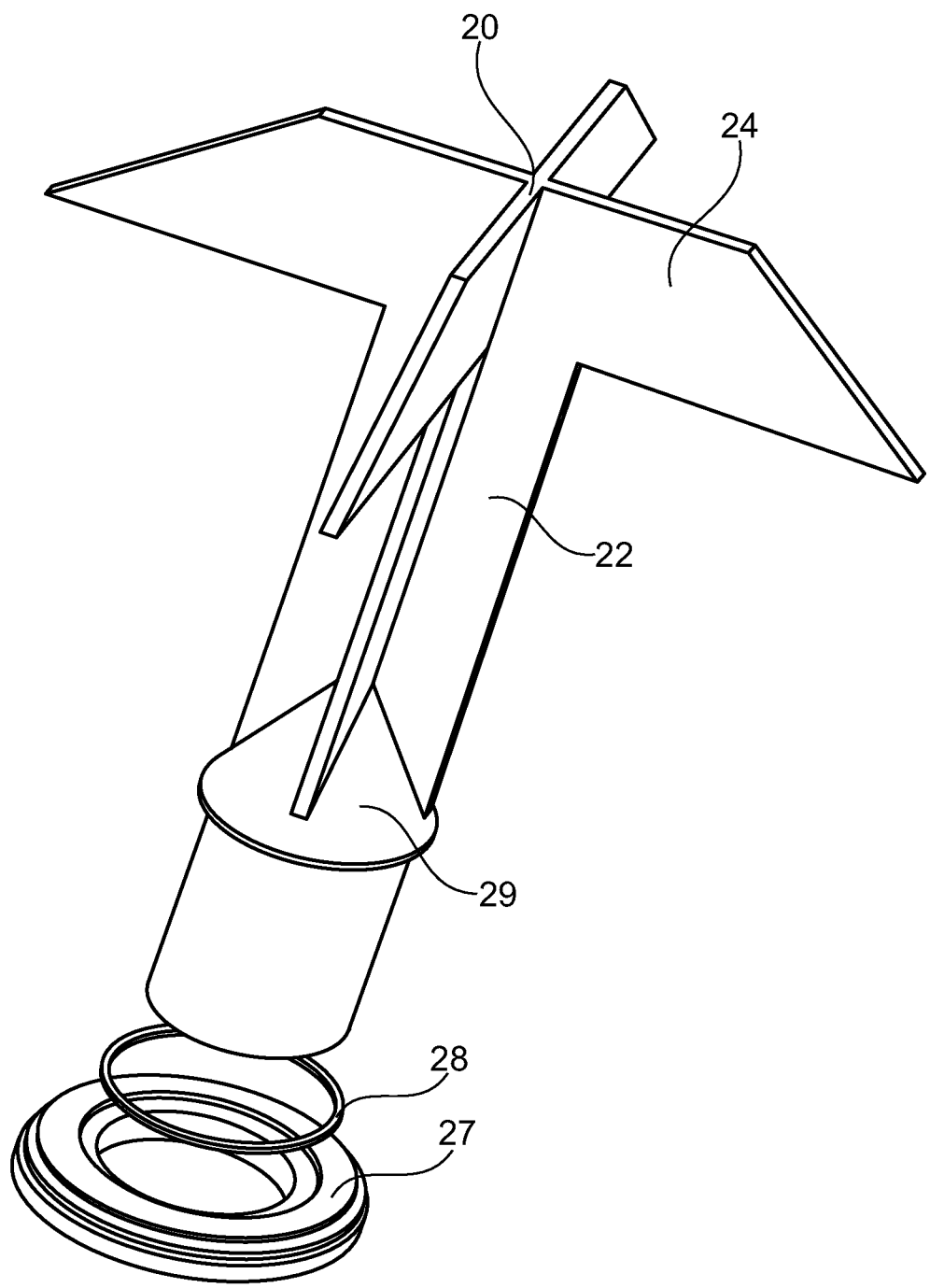
Figure 5:
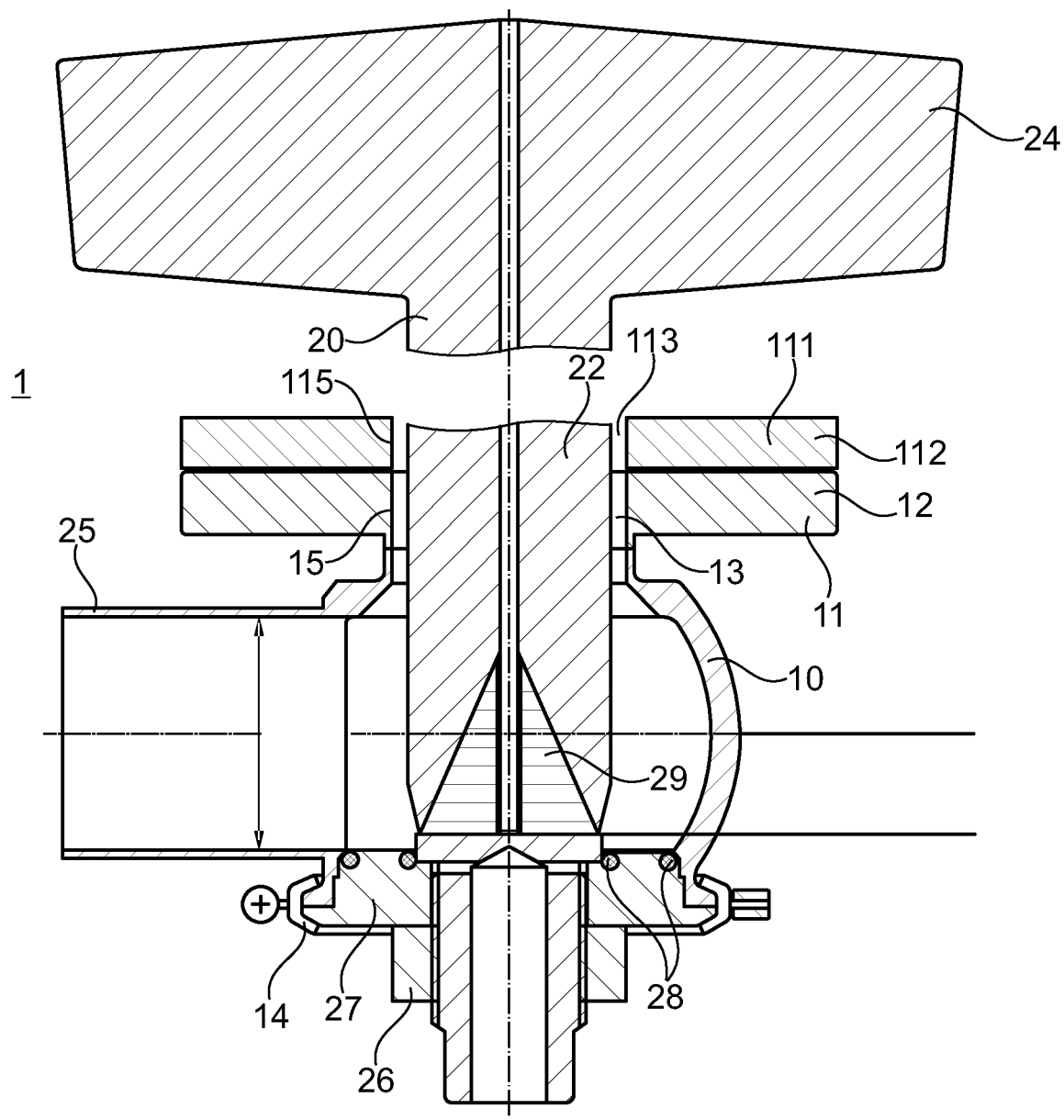
Figure 6B:
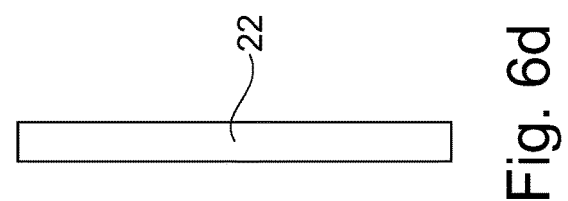
Figure 6A:
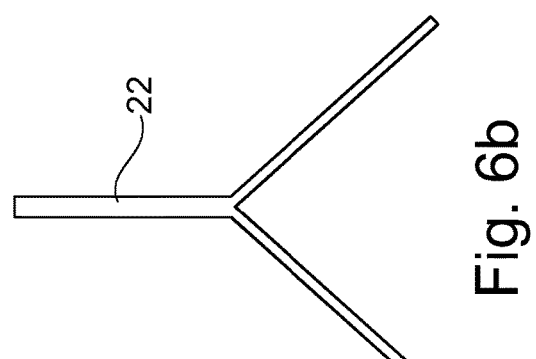
Figure 6D:
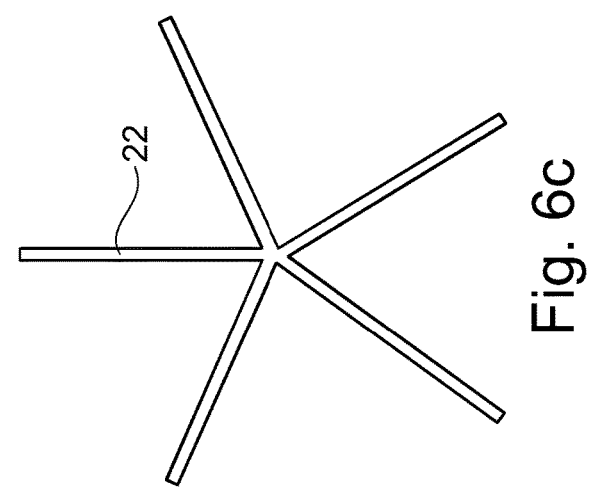
Figure 6C:
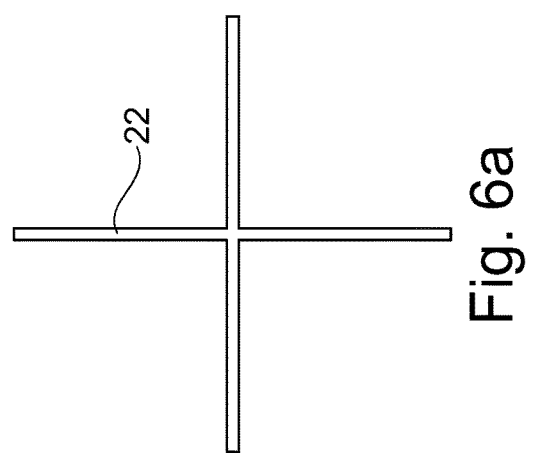
Figure 7A:
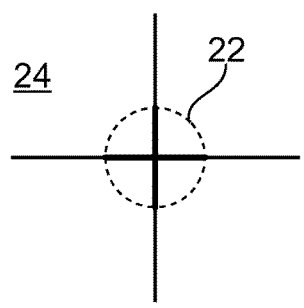
Figure 7B:
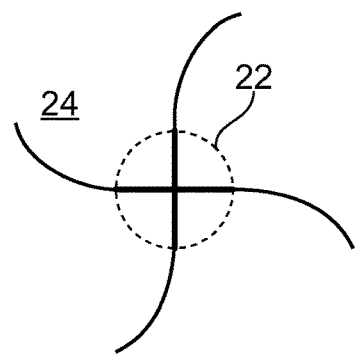
Figure 7C:
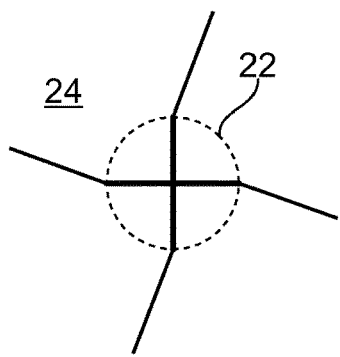
Figure 7D:
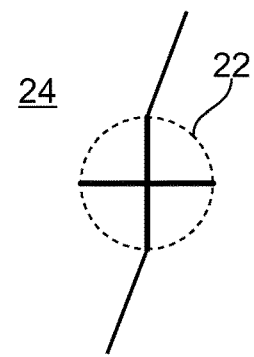
Figure 7E:
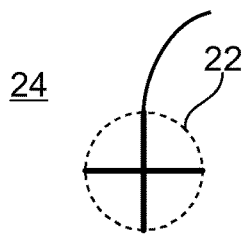
Figure 7F:
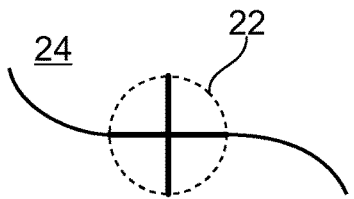
Figure 7G:
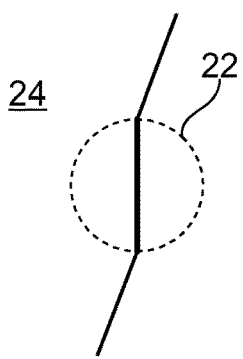
Figure 7H:
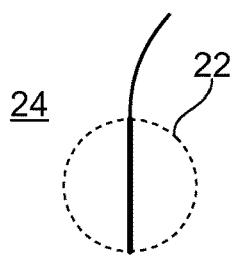
Figure 7I:
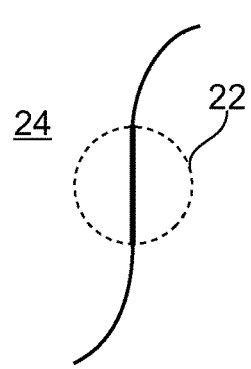

Below, preferred embodiments of the present invention are represented with reference to the enclosed figures. The figures show:

FIG. 1 a three-dimensional representation of an embodiment of a tank outlet with a vortex breaker in accordance with the invention;

FIG. 2 a three-dimensional representation of a tank with a tank outlet according to FIG. 1;

FIG. 3 a three-dimensional representation of a further embodiment of the tank outlet with a vortex breaker in accordance with the invention;

FIG. 4 a three-dimensional exploded view of the vortex breaker of FIG. 3;

FIG. 5 a vertical cross-sectional view of the tank outlet with a vortex breaker;

FIG. 6 preferred cross-section forms of the foot region of the vortex breaker; and FIG. 7 preferred cross-section forms of the head region of the vortex breaker.

5. DETAILED DESCRIPTION OF PREFERRED EMBODIMENTS

Below, preferred embodiments of the present invention will be described in detail with reference to the enclosed figures.

FIG. 1 shows a first embodiment of the tank outlet 1 with vortex breaker 20 according to the invention. The vortex breaker 20 essentially comprises a head region 24 located on the inside of the tank and a foot region 22 which the vortex breaker 20 is solely mounted to. In the shown embodiment, the vortex breaker 20 is designed as one piece. However, the vortex breaker 20 may also be assembled of two or more parts forming head region 24 and foot region 22. The material of the vortex breaker 20 preferably is a hard synthetic material or a metal, to withstand the occurring flow forces.

The foot region 22 of the vortex breaker 20 essentially divides the inlet opening 13 into four regions of the same size, through which the content of the tank may stream from the head region 24 towards the cavity of the tube fitting body 10. The same distribution is carried out in the outlet opening 113 of the outlet region 111 adjoining the inlet region 11, as shown in FIG. 2 and in FIG. 5. The content of the tank may also flow through between the narrow front sides of the vertical elements of foot region 22 and the spaced interior wall of the inlet region 11 and the outlet region 111, thus preventing a deposit of liquid residues. Therefore, the vortex breaker 20 may also be purified from all sides. Due to the fact that the flow cross-section of the inlet opening 13 and the outlet opening 113 is divided into separate regions, no horizontal rotation of the liquid about the vertical center axis of the flow cross-section may form. Thus, no vortices can occur or be led from the centrifugal pump further into the tank.

The inlet region 11 of the form fitting body 10 is mounted on the outlet region 111 of the tank 100 by means of mounting means 12, 112. In the embodiment shown in FIGS. 1-3 and in FIG. 5, the mounting means are flanges that form a flange connection with an axial screw connection and are screwed to one another in order to provide a pressure-proof connection between the inlet region 11 and the outlet region 111. In other embodiments, the mounting may also be provided by means of a screwed pipe connection, for example according to DIN 11853, or a clamping connection, i.e. a flange connection with a clamp, such as a tri-clamp, or similar connections. In the embodiments that were just described, the inlet region and the outlet region are connected to one another detachably. Moreover, in other embodiments, flanges welded to one another are also possible.

The foot region 22 is connected to a base 29 firmly and in a liquid-tight manner. The base 29 preferably has a conical form, the circular bottom of the cone providing a thread for screwing the vortex breaker 20 to a cover 27. The long mounting edges between the foot region 22 and the base 29 enable a stable mechanical connection, which may for example be welded or glued or created by means of other mounting means. In other embodiments, the base may also have other geometries, such as a pyramid shape. The depicted base forms edges with angles equal to or greater than 90 degrees, such that possible deposits may be easily purified, e.g. rinsed, and do not stick. Corners and edges with angles smaller than 90 degrees constitute spots that are difficult to purify and should be avoided particularly for sanitary reasons. The material of the base may be the same material as that of the other parts of the vortex breaker, or it may be another material. The base may also be manufactured as one piece together with the other parts, for example in an injection molding process.

In a preferred embodiment, the foot region 22 may be formed as a single piece with the head region 24, for example in an injection molding process or by welding sheet metal parts. The foot region 22 may also be detachably connected to the head region 24 in another embodiment. A detachable connection allows for replacing parts of the vortex breaker. In addition to this, the foot region 22 and the head region 24 may have different geometries in a horizontal cross section. However, the cross sections are always shaped such that they prevent the content of the tank from rotating about the vertical center axis of the tank outlet 1. Preferred cross sections of the foot region 22 are shown in FIG. 6. Preferred cross sections of the head region 24 are shown in FIG. 7 together with the projection surfaces of the foot region 22 shown on the inside.

A plurality of geometries are possible for the cross sections of the head region 24 in a horizontal plane, said geometries essentially preventing the liquid from rotating about the vertical center axis of the outlet opening. In this regard, preferred geometries are a cross-shaped cross section (FIG. 6a), a star-shaped cross section with three arms at an angle of 120 degrees starting from the center (FIG. 6b), an S-shape, a star-shaped cross section with five arms at an angle of 72 degrees starting from the center (FIG. 6c) or a straight or linear cross section (FIG. 6d) for the foot region 22. Preferred cross-sections for the head region 24 are a cross-shaped cross section (FIG. 7a), crossed S-shaped cross sections (FIGS. 7b, 7c), half-side S-shaped cross sections (FIGS. 7e, 7h) or S-shaped cross sections (FIGS. 7d, 7f, 7g, 7i).

The narrow remaining spaces between the edge of the foot region 22 of the vortex breaker 20 and the inner walls 15, 115 of the inlet and outlet regions 11, 111 are negligible in terms of fluidics for preventing vortices. However, these are decisive for guaranteeing that the vortex breaker may be entirely purified and that no dead spots occur.

The cavity of the tube fitting body 10 is separated liquid-tight from the screw connection 26 by means of two seals 28. Each seal 28 preferably comprises ordinary gaskets made of a synthetic material or a similar material. Such gaskets are cost-effective and easy to replace. If the gaskets are clamped between the cover 27 and the base 29 as well as between the cover 27 and the tube fitting body 10, they expand into one direction to a convex curvature towards the inside of the tube fitting body. Such a convex curvature of the surface is also easy to purify, as the angles at the edges amount to more than 90 degrees.

The vortex breaker 20 is connected to the tube fitting body 10, in particular to its cover 27, by means of a screw connection 26. In the built-in state, the vortex breaker 20 is not rotatable anymore which counteracts a formation of vortices. The screw connection 26 is mounted outside the tube fitting body 10. Therefore, it is on the one hand easily accessible which is of advantage for mounting it. On the other hand, hence, the screw connection 26 does not come into contact with the liquid, which is advantageous for a sanitary purification. The vortex breaker 20 may also be mounted on the tube fitting body 10 by means of other mounting types, for example by clamping, welding, gluing etc. However, in these cases the advantages of the screw connection are not given.

In the shown embodiment, the vortex breaker 20 is mounted on an openable cover 27. The cover 27 may be easily opened and exchanged and replaced by a closed cover 27 in case the vortex breaker 20 is dismounted. The cover 27 is mounted on the tube fitting body 10 by means of mounting means 14. In the embodiment shown in FIGS. 1-3 and 5, the mounting means 14 is a clamp. However, the cover 27 may also be mounted on the tube fitting by means of other mounting types, for example be screwed to it.

For inserting the vortex breaker 20, the cover 27 preferably comprises at least one opening, through which a mounting means, such as for example the base 29, may be inserted.

FIG. 2 shows a part of a tank 100 with a built-on tank connection 1 with a vortex breaker 20. The tank 100 may for example be a tank for liquids, suspensions or other fluids, in particular for liquid food products. The outlet of the tank 100 is advantageously located at the underside of the tank 100 at tank bottom 102 in order to drain the tank 100 completely by means gravity. Additionally, a pump, in particular a centrifugal pump (not shown), may be used to drain the tank 100. The draining process is accelerated by means of the pump; however, the pump may also induce vortices in the content of the tank. These induced vortices then spread back into the tank 100 via the outlet pipe 25. The formation of vortices is to be prevented in both directions around the tank outlet 1.

In order to prevent the expansion of vortices from the pump into the direction of the tank 100, the foot region 22 is located in the flow-through region of the inlet and outlet openings 13, 113. The head region 24 of the vortex breaker is located on the other side of the tank outlet opening above the opening of the tank outlet 1 within the tank in order to prevent a formation of vortices within the tank in the proximity of the outlet. The height of the vortex breaker 20 is adapted to the geometry of the tank outlet 1. Preferably, the vortex breaker 20 is arranged above the opening of the tank outlet 1 with a small distance and does not touch the tank 100. Preferably, the distance between the lower edge of the head region 24 and the upper edge of the tank bottom 102 amounts to less than 5 cm, more preferably to less than 3 cm.

FIG. 3 shows a further embodiment of the tank outlet 1 with vortex breaker 20. In this embodiment, the edges of the head region 24 of the vortex breaker 20 are chamfered. Such a chamfer generates different flow characteristics of the liquid when the tank 100 is drained. Due to the fact that the vortex breaker 20 is mounted detachably, it is also possible to easily exchange different possible embodiments of the vortex breaker 20 with each other.

For example, the size of the vertical elements of the vortex breaker 20 may be varied depending on which liquids, with a specific, differing density, are stored in the tank 100. For substances with a higher density or viscosity, in some circumstances a smaller size or other form of vertical elements may be advantageous as compared to substances with a lower density or viscosity. Moreover, the distance between the front sides of the vertical elements of the foot region 22 and the inner walls of the inlet and outlet regions 11, 111 may also be varied/adapted. For substances with a higher viscosity, a larger distance may be more advantageous than for substances with a lower viscosity. If the adhesion and friction surface on the vortex breaker 20 is smaller for a substance with a higher viscosity, the substance may drain faster and the tank 100 may be emptied faster, while the formation of vortices is still prevented.

FIG. 4 shows an exploded view of the vortex breaker 20 in a further embodiment. In this view, the cover 27 with the central mounting opening for receiving the basis 29 is clearly visible. When the vortex breaker 20 is mounted, the base 29 of the vortex breaker 20 is simply inserted through the opening in the cover 27, sealed with the seal 28 and then screwed from outside with the nut 26. In another embodiment, the cover 27 may also comprise a thread for receiving the base 29. Due to the seal 28, it also does not come into contact with the content of the tank.

By changing the height of the base 29 or of the foot region 22, the height of the vortex breaker 20 may be adapted to the geometry of the tank outlet 1. The simple geometries of the vortex breaker, such as truncated cone, rectangular or trapezoid vanes etc. allow for easy manufacturing and purification of the vortex breaker 20.

The sectional view of FIG. 5 clarifies the details of mounting the vortex 20 solely on the tube fitting body 10. The outlet region 111 and the inlet region 11 are arranged with a distance from the foot region 22 of the vortex breaker 20. As shown in FIG. 5, the head region 24 is significantly wider than the flow cross-section through the inlet and outlet openings 13, 113. Hence, the content of the tank is calmed in a large region around the drain opening during flowing in and out and a formation of vortices is thus prevented.

Mounting on the cover 27 of the tube fitting body 10 is sufficient for mounting the vortex breaker 20. For this purpose, the cover 27 has an opening through which the base 29 of the vortex breaker 20 is inserted. If the tank outlet 1 is to be used without a vortex breaker, the cover 27 may be replaced with a cover 27 without an opening. Hence, the modification of an existing tank outlet 1 may be carried out easily and reversibly.

Through a separate tank access, for example a purification opening (not shown), a technician may access the inside of the tank 100 and manually insert the vortex breaker into the opening of the outlet region 111.

REFERENCE NUMBERS 1 tank outlet
10 tube fitting body
11 inlet region
12 mounting means
13 inlet opening
14 mounting means
15 wall
20 vortex breaker
22 foot region
24 head region
25 outlet pipe
26 screw connection
27 cover
28 seal
29 base
100 tank
102 tank bottom
111 outlet region
112 mounting means
113 outlet opening
115 wall

The invention claimed is:

1. A tank outlet of a tank, comprising:
a tube fitting body, with an inlet region, mountable on an outlet region of a tank;
a vortex breaker solely mounted on the tube fitting body, the vortex breaker including:
a foot region mounted on the tube fitting body, and
a head region held inside the tank by the foot region;
wherein the head region of the vortex breaker comprises at least one dimension, measured in the horizontal plane, which is larger than the diameter of an inlet opening in the inlet region of the tube fitting body, and
wherein the vortex breaker extends through the inlet region into the tank and does not touch the tank and does not touch a wall of the inlet opening in the inlet region of the tube fitting body.

2. A tank outlet of a tank, comprising:
a tube fitting body, with an inlet region, mountable on an outlet region of a tank;
a vortex breaker solely mounted on the tube fitting body;
wherein the vortex breaker extends through the inlet region into the tank and does not touch the tank;
wherein a foot region of the vortex breaker is detachably mounted on the tube fitting body by means of a screw connection;
wherein the screw connection comprises a seal sealing the screw connection outside a liquid region towards a cavity of the tube fitting body, and
wherein the seal is arranged on respective edges between a cover and a base of the foot region as well as the cover and the tube fitting body, and forms a convexly shaped surface towards the inside of the tube fitting body.

3. The tank outlet of a tank according to claim 2, wherein the vortex breaker has continuously closed surfaces.

4. The tank outlet of a tank according to claim 2, wherein the foot region of the vortex breaker divides the inlet opening into at least two sections.

5. The tank outlet of a tank according to claim 2, wherein the foot region of the vortex breaker comprises a maximum dimension measured in the horizontal plane, which is smaller than the diameter of the inlet opening.

6. The tank outlet of a tank according to claim 2, wherein the foot region of the vortex breaker comprises vertically arranged essentially planar elements with a smooth surface.

7. The tank outlet of a tank according to claim 2, wherein a head region of the vortex breaker comprises vertically arranged essentially planar elements with a smooth surface.

8. The tank outlet of a tank according to claim 2, wherein the cover is an openable cover facing the inlet region, which the vortex breaker is mounted to.

9. The tank outlet of a tank according to claim 2, wherein the foot region further has a conical base.

10. A tank outlet of a tank, comprising:
a tube fitting body, with an inlet region, mountable on an outlet region of a tank;
a vortex breaker solely mounted on the tube fitting body, the vortex breaker including:
a foot region mounted on the tube fitting body, and
a head region held inside the tank by the foot region;
wherein the vortex breaker extends through the inlet region into the tank and does not touch the tank,
wherein the head region of the vortex breaker comprises at least one dimension, measured in the horizontal plane, which is larger than the diameter of an inlet opening in the inlet region of the tube fitting body, and
wherein the tube fitting body further comprises an openable cover facing the inlet region, which the vortex breaker is mounted to.

* * * * *